United States Patent
Lorenz et al.

(10) Patent No.: US 6,472,447 B1
(45) Date of Patent: Oct. 29, 2002

(54) STABILIZED, FINELY DISPERSE LOW-VISCOSITY POLYMER POLYOLS WITH A HIGH CONTENT OF POLYSTYRENE OR POLYSTYRENE COPOLYMERS

(76) Inventors: Klaus Lorenz, Bahnhofstr. 39, 41539 Dormagen (DE); Manfred Dietrich, Dresdener Str. 16, 51373 Leverkusen (DE); Michael Brockelt, Ulmenweg 7, 51373 Leverkusen (DE); Uwe Scholz, Ehlersweg 33, 25524 Itzehoe (DE); Robert-Joseph Kumpf, Am Kreuz 24, 40489 Düsseldorf (DE); Jürgen Grönen, Im Grasgarten 13, 51491 Overath (DE); Gundolf Jacobs, Im Pannenhack 15, 51503 Rösrath (DE)

( * ) Notice: Subject to any disclaimer, the term of this patent is extended or adjusted under 35 U.S.C. 154(b) by 0 days.

(21) Appl. No.: 09/488,468

(22) Filed: Jan. 20, 2000

(30) Foreign Application Priority Data

Jan. 29, 1999 (DE) .......................... 199 03 390

(51) Int. Cl.$^7$ ............................... C08G 18/62
(52) U.S. Cl. .................. 521/137; 528/75; 525/131; 525/404; 524/762; 252/182.17
(58) Field of Search ............................ 521/137; 528/75; 525/131, 404; 524/762; 252/182.17

(56) References Cited

U.S. PATENT DOCUMENTS

| | | | |
|---|---|---|---|
| 4,357,430 A | 11/1982 | VanCleve | .................. 521/128 |
| 4,454,255 A | 6/1984 | Ramlow et al. | ............. 521/137 |
| 4,689,354 A | 8/1987 | Ramlow et al. | ............. 521/137 |
| RE33,290 E | 8/1990 | Naka et al. | ................. 521/110 |
| 5,814,699 A | 9/1998 | Kratz et al. | ................... 525/53 |

FOREIGN PATENT DOCUMENTS

| | | |
|---|---|---|
| EP | 308139 | 3/1989 |
| EP | 343788 | 11/1989 |
| EP | 343908 | 11/1989 |
| EP | 0 732 360 | 9/1996 |
| EP | 0 495 551 | 4/1997 |
| EP | 786480 | 7/1997 |
| JP | 60020923 | * 2/1985 |

* cited by examiner

*Primary Examiner*—Rachel Gorr
(74) *Attorney, Agent, or Firm*—Joseph C. Gil; Denise Brown

(57) ABSTRACT

The present invention relates to finely dispersed, low-viscosity polymer polyols which are stabilized in a novel manner and which are characterized by a high content of polystyrene or polystyrene copolymers. This invention also relates to the preparation of such polymer polyols, and their use for the preparation of polyurethane materials.

5 Claims, No Drawings

STABILIZED, FINELY DISPERSE LOW-VISCOSITY POLYMER POLYOLS WITH A HIGH CONTENT OF POLYSTYRENE OR POLYSTYRENE COPOLYMERS

BACKGROUND OF THE INVENTION

The present invention relates to finely dispersed, low-viscosity polymer polyols which are stabilized in a novel manner and have a high content of polystyrene or polystyrene copolymers. It also relates to a process for the preparation of these polymer polyols and to their use for the preparation of polyurethanes, and particularly polyurethane foams.

Polymer polyols in the context of the invention are to be understood as products which can be obtained by polymerization of ethylenically unsaturated compounds in polyols, so-called base polyols. Suitable polyols on which the polymer polyols are based are those normally used in polyurethane chemistry, and above all the known polyester and polyether polyols and mixtures thereof. As mentioned above, the polymer polyols can be used for the preparation of polyurethane foams. The polymers of ethylenically unsaturated compounds contained in the polymer polyols, in particular based on styrene or mixtures of styrene and acrylonitrile, are used chiefly for controlled modification of the physical properties of the polyurethane plastics prepared from the polymer polyols.

To prevent the polymers based on ethylenically unsaturated compounds from sedimenting or coagulating in the so-called base polyols, so-called dispersion stabilizers are added to the base polyols. Examples of such dispersion stabilizers are the known macromers or the known prepolymers containing OH end groups. Such dispersion stabilizers are described, for example, in U.S. Pat. Nos. 4,357,430, 4,454,255 and 4,689,354, and in EP 0,768,324.

A disadvantage of using macromers as stabilizers in the preparation of polymer polyols with a high content of polystyrene is that it is very difficult to obtain finely dispersed products which can be filtered. If prepolymers with terminal OH groups are used as stabilizers for such polymer polyols, there is the disadvantage that such polymer polyols have comparatively high viscosities.

An improved stabilizer system for polystyrene-rich polymer polyols is described, for example, in EP 0,495,551 and EP 0,786,480, in which polyether polyols linked via polyfunctional isocyanates are employed as stabilizers. However, when the stabilizers of in EP 0,495,551 and EP 0,786,480 are employed, these also do not result in satisfactory viscosities for polymer polyols with a high solids content.

The object of the present invention is to provide improved finely dispersed, low-viscosity polymer polyols which are easy to filter and have a high content of styrene or styrene copolymers, while avoiding the disadvantages with respect to stabilizing the polystyrene-rich polymer polyols to date.

DESCRIPTION OF THE INVENTION

The present invention therefore provides finely dispersed, low-viscosity polymer polymers which are stabilized in a novel manner. These polymer polyols comprise:
(A) a base polyol;
(B) a polymer comprising (1) styrene, or (2) a mixture of styrene and at least one other ethylenically unsaturated monomer; and
(C) a polymer containing mercaptan and/or disulfide groups which is compatible with base polyol component (A), has an average molecular weight of 500 to 100,000, an average of at least 0.5 mercaptan groups or 1 disulfide group per molecule and a viscosity in the range of 100 to 80,000 mPa.s (measured at a temperature of 25° C., according to DIN 53019/shear rate: 48/s), wherein component (B) is present in an amount of 30 to 60% by weight and component (C) is present in an amount of 1 to 6% by weight, with the %'s by weight of (B) and (C) being based on the combined weight of components (A), (B) and (C) in the finished polymer polyol.

In the polymer polyols according to the present invention, it is preferred that component (B) is present in an amount of 35 to 55% by weight, and that component (C) is present in an amount of 2 to 4% by weight, with the %'s by weight of (B) and (C) being based on the combined weight of components (A), (B) and (C) in the finished polymer polyol.

Suitable polyols to be used as the base polyol component (A) of the present invention include all polyols which are known and conventionally employed in the preparation of polyurethanes. These include the known polyether polyols and polyester polyols, which can be employed both individually and in any desired mixtures with one another. Polyurethanes containing several hydroxyl end groups, phosphorus compounds containing several hydroxyl groups, and other compounds containing several hydroxyl groups, such as are described in detail in, for example, U.S. Pat. No. 4,454,255, are also suitable to be used as base polyols in the present invention.

It is preferred that polyether polyols and/or polyester polyols are employed as the base polyol, and most preferably polyether polyols are employed.

Suitable polyether polyols to be employed as the base polyol of the present invention include, preferably, those which are obtained by an addition reaction of a suitable starter compound containing at least two active hydrogen atoms on cyclic ethers. Examples of such polyether polyols are those which are obtained by reaction of an alkylene oxide such as, for example, ethylene oxide, propylene oxide, butylene oxide, tetrahydrofuran and mixtures thereof, with one or more polyfunctional starter compounds, such as alkylene glycols, e.g. glycerol, trimethylolpropane, pentaerythritol, sorbitol, glucose and sucrose. Other suitable starter compounds include, for example, water, ammonia, amino alcohols such as, for example, ethanolamine, diethanolamine and triethanolamine, and primary and/or secondary amines or polyamines, such as, for example, ethylenediamine, aniline and toluenediamine. The polyether polyols to be employed as base polyols according to the invention usually have a molecular weight of 500 to 12,000, preferably 2,000 to 8,000, and have a hydroxyl functionality of 2 to 6. Polyether polyols which are more preferably employed are those which are obtained by reaction of ethylene oxide and/or propylene oxide with the above mentioned starter compounds containing several hydroxyl groups.

Suitable polyester polyols which are used in the mixtures according to the invention are, in particular, those which are derived from polycarboxylic acids and polyalcohols. Polycarboxylic acids which are suitable for the preparation of polyester polyols include compounds such as, for example, oxalic acid, malonic acid, glutaric acid, adipic acid, maleic acid, fumaric acid, isophthalic acid and/or terephthalic acid. Suitable polyalcohols include both aliphatic polyalcohols and aromatic polyalcohols such as, for example, ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1 -trimethylolpropane, 1,1,1 -trimethylolethane, 1,2,6-hexanetriol, α-methylglycositol, pentaerythritol and/or sorbitol, and polyether polyols with a molecular weight of 500 to 6,000 and a hydroxyl functionality of 2 to 8. Polyalcohols which are derived from phenol, such as bisphenol A, can furthermore be employed. Polyester polyols which can also be employed are those which are derived from corresponding polyester-amides (reaction products of corresponding amines or amino alcohols with polycarboxylic acids, such as are described in, for example, U.S. Pat. No. 4,454,255). Polycarbonates containing hydroxyl groups are also suitable.

The reaction products from the above mentioned polycarboxylic acids with the polyether polyols and/or the low molecular weight polyols in a suitable ratio of amounts are preferably employed as polyester polyols.

The polyester polyols to be employed as based polyols in the present invention have an average molecular weight which substantially corresponds to the average molecular weight of the above mentioned polyether polyols. This also applies to the hydroxyl functionality.

Those polymers which are built up from (1) styrene, or (2) a mixture of styrene and at least one other ethylenically unsaturated monomer are used as component (B) in the polymer polyols according to the present invention. Those ethylenically unsaturated monomers which can be copolymerized with styrene are preferred. Examples of ethylenically unsaturated monomers which can be polymerized with styrene include all compounds which contain double bonds which are capable of being polymerized by free radicals such as, for example, butadiene, α-methylstyrene, methylstyrene isomers, ethylstyrene isomers, acrylonitrile, methacrylonitrile, methacrylic acid esters such as methyl methacrylate, acrylic acid alkyl esters and aliphatic or aromatic di(meth)acrylates, as well as oligomeric butadienes and derivatives of maleic acid such as maleimides. The polymerization of styrene can of course be carried out with two different co-monomers, so that corresponding terpolymers are formed. However, the use of polystyrene as component (B) and of copolymers of styrene and acrylonitrile as component (B), the amount of acrylonitrile in the copolymer being 60 to 0.5% by weight, is preferred. It is particularly preferred for polystyrene to be employed by itself as component (B).

As mentioned, polymers containing mercaptan groups and/or disulfide groups which are compatible with the base polyol, i.e. component (A), are suitable for use as component (C) (also referred to as the stabilizer) in the present invention. The average molecular weight of such polymers containing mercaptan groups is preferably 1,000 to 80,000.

Component (C) is described as compatible with component (A) if component (C) forms a substantially homogeneous mixture with component (A).

Preferably, component (C) contains in the polymer molecule, on average, from 0.5 to 30 mercaptan groups, and more preferably from 1 to 8 mercaptan groups, or from 1 to 15, preferably from 2 to 4, disulfide groups. These figures apply where component (C) contains only mercaptan groups or only disulphide groups in the polymer molecule.

As mentioned, all polymers which contain mercaptan groups or disulfide groups and are compatible with polyol component (A) are suitable to be used as component (C) in the present invention. Those polymers on which component (C) are based which may be mentioned are polyether polyols (PE), polyester polyols (PES) and/or polyurethane polyols.

Polyether polyols, polyester polyols and/or polyurethanes which contain mercaptan groups and have an OH number of 5 to 150, preferably 10 to 100, and the above mentioned number of mercaptan groups in the molecule are preferably employed as component (C).

In the polyether polyols containing mercaptan groups and the polyester polyols containing mercaptan groups, the mercaptan groups are bonded to the polyether polyols or polyester polyols via ether or ester groupings, respectively. In the polyurethanes, the mercaptan groups are bonded to the polyurethane via carbamate groupings.

Polyether polyols containing mercaptan groups and polyester polyols containing mercaptan groups which are most preferably employed as component (C) are those which contain mercaptan groups, bonded via ester groupings, of the formula (I)

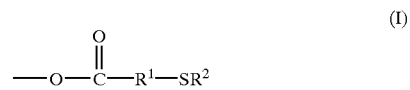

wherein:
R$^1$: represents a straight-chain, branched or cyclic alkylene radical having 1 to 20 carbon atoms, preferably 1 to 10 carbon atoms; and
R$^2$: represents hydrogen.

The radical R$^1$ can, of course, be mono- or poly-substituted with those substituents which do not impair the compatibility of component (C) with the base polyol, i.e. component (A). Some examples of such substituents include radicals and atoms such as alkoxy radicals having 1 to 4 carbon atoms, polyoxy-C$_1$ to C$_4$-alkylene radicals and halogen atoms.

Suitable polyurethanes containing mercaptan groups which are suitable for use as component (C) in the present invention include, in particular, those in which the mercaptan groups are bonded to the polyurethane via a carbamate grouping, wherein the mercaptan bonded via a carbamate grouping corresponds to the formula (II)

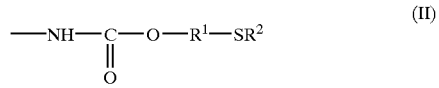

wherein:
R$^1$: represents a straight-chain, branched or cyclic alkylene radical having 1 to 20 carbon atoms, preferably 1 to 10 carbon atoms; and
R$^2$: represents hydrogen or SR$^3$,
wherein:
R$^3$: represents a straight-chain, branched or cyclic alkyl radical having 1 to 20, preferably 1 to 10, carbon atoms.

The polyether polyols and polyester polyols which are described above as being suitable for the base polyol, i.e. component (A), can be employed as the polyether polyols and polyester polyols on which component (C), the mercaptan group containing polymer is based.

The polyether polyols containing mercaptan groups and the polyester polyols containing mercaptan groups can be obtained, for example, by the reaction of the polyether polyols or polyester polyols described above, with corresponding mercaptans, such as, for example, mercaptoacetic acid or mercaptopropionic acid.

Such reactions are described, for example, in JP 09 124 738-A and JP 05 320 231-A.

It is, of course, also possible to prepare the polyether polyols containing mercaptan groups or the polyester polyols containing mercaptan groups by the reaction of corresponding build-up components of the polyether polyols or polyester polyols with corresponding mercaptans in situ.

The polyurethanes containing mercaptan groups comprise reaction products of a polyether polyol or polyester polyol, a polyisocyanate and a mercaptan containing hydroxyl groups such as, for example, mercaptoethanol. The preparation of such products is described, for example, by D. Dieterich in Houben-Weyl, Methoden der Organischen Chemie, volume E20, page 1658 (Georg Thieme Verlag, Stuttgart, N.Y. 1987).

As mentioned, the polymer polyols of the present invention are finely dispersed, and are characterized by low-viscosities. The viscosities of these polymer polyols are in the range of from 2,500 to 15,000 mPa.s, preferably of 2,500 to 10,000 mPa.s, and most preferably of 2,500 to 6,500 mPa.s, as measured at a temperature of 25° C. (in accordance with DIN 53 019/shear rate: 48/s).

The present invention also relates to a process for the preparation of the stabilized, finely dispersed, low-viscosity polymer polyols according to the invention.

A preferred process for the preparation of the polymer polyols according to the invention comprises:

(I) preparing component (B) by polymerizing (1) styrene, or (2) a mixture of styrene with at least one other ethylenically unsaturated monomers which can be copolymerized with styrene, in the presence of (A) the base polyol to be employed according to the invention, and (C) the polymer(s) containing mercaptan groups and/or disulfide groups, and (D) an active amount of an initiator which forms free radicals, wherein component (C) is present in an amount of 1 to 6% by weight, and the styrene which builds up component (B), optionally with one or more ethylenically unsaturated monomers which can be copolymerized with styrene, is present in an amount such that the amount of component (B) is present in the finished polymer polyol in 30 to 60% by weight, with these %'s by weight being based on the combined weight of components (A), (B) and (C) of the finished polymer polyol.

As previously mentioned, the polymerization of styrene, or of styrene with other ethylenically unsaturated monomers which are capable of being copolymerized with styrene, occurs in the presence of component (A), the base polyol, and in the presence of component (C), the polymer containing mercaptan groups and/or disulfide groups, typically at temperatures of approx. 60° C., to 140° C., preferably 80 to 100° C. The pressures here can be 1 to 10 bar.

It is also possible to carry out the polymerization of styrene or of styrene with other ethylenically unsaturated monomers, not only in the presence of component (A), the polyol, and in the presence of component (C), the polymer containing mercapto groups and/or disulfide groups, but also in the presence of a small quantity, such as for example 2 to 8% by weight, based on the weight of the finished polymer polyol, of a previously separately produced polymer polyol (the so-called seed polymerization process).

The polymerization can optionally be carried out in the presence of (E) a solvent, with the amount of the solvent being up to 20% by weight, based on the total quantity of the finished polymer polyol. The polymerization is preferably carried out in the presence of polar solvents such as, for example, in the presence of lower mono- or oligo-functional alcohols, such as, for example, methanol, ethanol, n-propanol, isopropanol, n-butanol, 2-butanol, ethylene glycol and/or amyl alcohol. The use of solvent mixtures which are obtained, for example, by addition of toluene, ethylbenzene or other aromatic or aliphatic solvents to the alcohols, is also conceivable. The solvent or the solvent mixture can be added to the reaction mixture either completely or in part during the polymerization reaction.

Low molecular weight compounds can furthermore be added during the polymerization, to control the molecular weight of the polymer. These are typically referred to as chain transfer agents. Examples of such compounds are dodecanethiol, tert-dodecylmercaptan, 2-thioethanol, thioglycerol and halogenated compounds, such as, for example, carbon tetrachloride.

The initiator which forms free radicals is conventionally employed in amounts of approx. 0.3 to 1.5 mol %, based on the amount of monomer employed for building up component (B).

Suitable free-radical initiators include, for example, organic (hydro)peroxides such as, for example, dibenzoyl peroxide, tert-butyl peroctoate and tert-amyl peroxy-2-ethylhexanoate, and azo compounds such as, for example, azoisobutyronitrile and 2,2'-azobis-(2-methylbutyronitrile).

In the process according to the invention it is of course possible either to introduce the initiator initially or to add it partly or completely during the polymerization reaction.

Other additives known in polyurethane chemistry which are of importance and useful for the profile of properties of the shaped polyurethane articles to be produced from the polymer polyols, and in particular foams, can, of course, also be added to the polymer polyols according to the invention.

For example, it is possible to combine the polymer polyols according to the invention with flameproofing agents, antioxidants, catalysts, crosslinking agents and chain-lengthening agents, inhibitors, surfactants and emulsifiers, as well as foam stabilizers, cell regulators and blowing agents, in the conventional amounts. Such auxiliary substances and additives are described, for example, in Kunststoff-Handbuch, Polyurethane, 3rd revised edition, volume VII, Carl-Hanser-Verlag, Munich, Vienna. It is easy to determine the most favorable amount of auxiliary substances and additives by suitable preliminary experiments.

The polymer polyols according to the invention are preferably suitable for the preparation of polyurethane materials, and, in particular polyurethane foams, which in turn are used, for example, in the car and furniture industry.

The polyurethane foams of the present invention can be prepared in the conventional manner by reacting the novel polymer polyols according to the invention, with organic polyisocyanates, in the presence of suitable blowing agents and, as already mentioned, in the presence of known auxiliary substances and additives. In particular, the solids content of the polymer polyol component can be adapted to suit the requirements by admixing any desired polyols. Suitable organic polyisocyanates include, for example, aromatic, aliphatic and cycloaliphatic isocyanates or mixtures thereof and/or chemical modifications of these isocyanates.

Suitable blowing agents for the preparation of polyurethane foams include the known blowing agents such as, for example, water, low-boiling hydrocarbons such as, for example, butanes, pentanes, hexanes, heptanes, pentenes and/or heptenes, including cyclic compounds thereof, azo compounds, halogenated hydrocarbons such as, for example, dichlorodifluoromethane, trichlorofluoromethane, dichlorodifluoroethane, vinyl chloride and/or methylene chloride, as well as carbon dioxide and adducts of tertiary amines and $CO_2$. In this regard, reference is made to DE 19,702,208 and U.S. Pat. No. 4,454,255, in which the preparation of polyurethane foams is described in more detail.

The invention is further illustrated but is not intended to be limited by the following examples in which all parts and percentages are by weight unless otherwise specified.

EXAMPLES

Starting Substances

Polyol A: Polyether polyol having a molecular weight of 11,800, based on sorbitol and prepared by addition of propylene oxide (82%) and ethylene oxide (18%), and having an OH number of 28.5.

Polyol B: Polyether polyol having a molecular weight of 4,950, based on glycerol and prepared by addition of propylene oxide (83%) and ethylene oxide (17%), and having an OH number of 34.

Polyol C: Polyether polyol having a molecular weight of 3,250 based on glycerol and prepared by addition of propylene oxide (90%) and ethylene oxide (10%), and having an OH number of 52.

Mercaptoacetic acid: Product commercially available from Merck (purity >98%).

Initiator 1: VAZO 67® (2,2'-azobis(2-methylbutyronitrile), product commercially available from DuPont.

Initiator 2: Luperox 575® (tert-amyl peroxy-2-ethylhexanoate), product commercially available from Elf Atochem.

Filtration Test (Filter Evaluation)

After cooling to about 100° C.—as described below in the examples—the product was passed through a sieve having a mesh width of 100 μm on a sieve plate. Unless stated otherwise, no pressure was applied here. The content of coarse particles in the polymer polyol was evaluated according to the amount of solid retained by the filter cloth: "1"=minimal amounts of solid; "2"=small amounts of solid; "3"=somewhat larger amount of solid, with the perforation pattern of the sieve plate being just detectable on the filter cloth; "4"=even somewhat larger amount of solid, with the perforation pattern of the sieve plate being clearly detectable on the filter cloth.

Example 1

Preparation of a Stabilizer (Component (C), i.e. a Polymer Containing Mercaptan Groups and/or Disulfide Groups)

2,200 g Polyol A, 21.45 g mercaptoacetic acid, 660 g toluene and 1.42 g 85% p-toluenesulfonic acid were initially introduced into the reaction vessel. Nitrogen was passed through the solution for ½ h. The mixture was heated to a temperature of 139° C. to 141° C. for 7 h using a water separator, and the toluene was then removed by applying a vacuum and heating at 110° C. Viscosity: 2,618 mPas (25° C., shear rate 48/s). OH number: 28.6 mg KOH/g; Acid number: 1.43 mg KOH/g.

Example 2

Preparation of a Stabilizer (Component (C), i.e. a Polymer Containing Mercaptan Groups and/or Disulfide Groups)

2,700 g polyol A, 12.64 g mercaptoacetic acid, 650 g toluene and 1.12 g 85% p-toluenesulfonic acid were initially introduced into the reaction vessel. Nitrogen was passed through the solution for ½ h. The mixture was heated to a temperature of 140° C. to 141° C. for 6 h using a water separator, and the toluene was then removed by applying a vacuum and heating at 110° C. Viscosity: 1,690 mPas (25° C., shear rate 48/s). OH number: 28.2 mg KOH/g; Acid number: 1.05 mg KOH/g.

Example 3

Preparation of a Stabilizer (Component (C), i.e. a Polymer Containing Mercaptan Groups and/or Disulfide Groups)

2,200 g polyol A, 21.45 g mercaptoacetic acid, 6.81 g adipic acid, 650 g toluene and 1.98 g 85% p-toluenesulfonic acid were initially introduced into the reaction vessel. Nitrogen was passed through the solution for ½ h. The mixture was heated to a temperature of 139° C. to 141° C. for 13 h using a water separator, and the toluene was then removed by applying a vacuum and heating at 110° C. Viscosity: 2,990 mPa.s, (25° C., shear rate: 48/s); OH number: 26.5 mg KOH/g; acid number: 1.05 mg KOH/g.

Example 4

Preparation of a Polymer Polyol (with Pure Polystyrene as the Dispersed Phase, at a Calculated Weight Content of 37 Parts by Weight, Based on the Weight of the Finished Polymer Polyol)

506.7 g polyol B, 20 g of the stabilizer from Example 2, 300 g ethanol, 80 g styrene and 0.6 g of Initiator 1 (VAZO 67®) were initially introduced into the reaction vessel. Nitrogen was passed through the solution for ½ h. The initial mixture was heated to a reaction temperature of 83° C. to 88° C. and allowed to react for 20 min. Then, 538 g polyol B, 75.8 g of the stabilizer from Example 2, 5.4 g Initiator 1 (VAZO 67®) and 660 g styrene were metered in at this temperature over a period of 2 h. Thereafter, 100 g polyol B, 13.5 g of the stabilizer from Example 2 and 50 g ethanol were metered in over a period of 1 h. The mixture was allowed to after-react for 2 h, and the solvent and residual monomers were then removed at 115° C. in vacuo. Thereafter, the resultant product was cooled to 100° C. and subjected to a filtration test as described above. This procedure for evaluating the filter cloth was also carried out in the examples described below. Styrene conversion: 98%; filter cloth evaluation: 1; viscosity (25° C., shear rate 48/s): 5,830 mPas.

Example 5

Preparation of a Polymer Polyol (with Pure Polystyrene as the Dispersed Phase, at a Calculated Weight Content of 37 Parts by Weight)

1,013.5 g polyol B, 22.2 g of the stabilizer from Example 1, 250 g ethanol and 740 g styrene were initially introduced into the reaction vessel, with nitrogen being passed through the solution at room temperature for ½ h before the addition of styrene. The initial mixture was heated to the reaction temperature of 83° C. to 88° C., and 150 g polyol B, 13.3 g of the stabilizer from Example 1, 50 g ethanol and 6.6 g Initiator 1 (VAZO 67®) were then metered in over a period of 90 min. Thereafter, 50 g polyol B, 4.4 g of the stabilizer from Example 1 and 50 g ethanol were metered in over a period of 40 min. The mixture was allowed to after-react for 20 min, and the solvent and residual monomers were then removed at 115° C. in vacuo. Styrene conversion: 94%; filter evaluation: 1; viscosity (25° C., shear rate 48/s): 4,960 mPas.

Example 6

Preparation of a Polymer Polyol (Dispersed Phase Comprises: Poly(styrene-co-acrylonitrile) in a weight ratio of styrene/acrylonitrile=60:40, at a calculated Weight Content of 37 Parts by Weight)

944 g polyol B, 15.3 g of the stabilizer from Example 1, 250 g ethanol, 48 g styrene and 32 g acrylonitrile were initially introduced into the reaction vessel. The initial mixture was heated to the reaction temperature of 83° C. to 88° C., and 150 g polyol B, 76 g of the stabilizer from Example 1, 50 g ethanol, 6.6 g Initiator 1 (VAZO 67®), 264 g acrylonitrile and 396 g styrene were then metered in over a period of 2 h. Thereafter, 50 g polyol B, 18 g of the stabilizer from Example 1 and 50 g ethanol were metered in over a period of 60 min. The mixture was allowed to after-react for 120 min, and the solvent and residual monomers were then removed at 115° C. in vacuo. Monomer conversion: 97.2%; filter evaluation: 2; viscosity (25° C., shear rate 48/s): 5,490 mPas.

Example 7

Preparation of a Polymer Polyol (Pure Polystyrene as the Dispersed Phase, at a Calculated Weight Content of 41 Parts by Weight)

935.2 g polyol C, 22.2 g of the stabilizer from Example 1, 63 g ethanol and 817.6 g styrene were initially introduced into the reaction vessel, with nitrogen being passed through the solution at room temperature for ½ h before the addition of styrene. The initial mixture was heated to a temperature of 88° C. to 89° C., and 150 g polyol C, 13.3 g of the stabilizer from Example 1, 13 g ethanol and 7.2 g Initiator 1 (VAZO 67®) were then metered in over a period of 100 min. Thereafter, 50 g polyol C, 4.4 g of the stabilizer from Example 1 and 13 g ethanol were metered in over a period of 40 min. The mixture was allowed to after-react for 60 min, and the solvent and unreacted styrene were then removed at 115° C. in vacuo. Styrene conversion: 97%; filter evaluation: 2; viscosity (25° C., shear rate 48/s): 5,450 mPas.

Example 8

Preparation of a Polymer Polyol (Pure Polystyrene as the Dispersed Phase, at a Calculated Weight Content of 37 Parts by Weight)

912.2 g polyol B, 22.2 g of the stabilizer from Example 1, 200 g ethanol and 740 g styrene were initially introduced into the reaction vessel, with nitrogen being passed through the solution at room temperature for ½ h before the addition of styrene. The initial mixture was heated to a temperature of 88° C. to 90° C., and 250 g polyol B, 13.3 g of the stabilizer from example 1, 50 g ethanol and 7.9 g Initiator 2 (Luperox 575®) were then metered in over a period of 90 min. Thereafter, 50 g polyol B, 4.4 g of the stabilizer from Example 1 and 50 g ethanol were metered in over a period of 40 min. The mixture was subsequently allowed to after-react at 88° C. to 90° C. for 60 min, and the solvent and unreacted styrene were then removed at 115° C. in vacuo. Styrene conversion: 96.2%; filter evaluation: 1; viscosity (25° C., shear rate 48/s): 12,390 mPas.

Example 9

Preparation of a Polymer Polyol (Polystyrene/2-ethylhexyl Acrylate Copolymer as the Dispersed Phase, at a Calculated Weight Content of 37 Parts by Weight)

1,013.4 g polyol B, 22.2 g of the stabilizer from Example 1, 250 g ethanol, 703 g styrene and 31 g 2-ethylhexyl acrylate were initially introduced into the reaction vessel, with nitrogen being passed through the solution at room temperature for ½ h before the addition of styrene. The initial mixture was heated to 88° C. to 90° C., and 150 g polyol B, 13.3 g of the stabilizer from example 1, 50 g ethanol, 6 g 2-ethylhexyl acrylate and 6.6 g Initiator 1 (VAZO 67®) were then metered in over a period of 100 min. Thereafter, 50 g polyol B, 4.4 g of the stabilizer from Example 1 and 50 g ethanol were metered in over a period of 40 min. The mixture was allowed to after-react at 90° C. for 60 min, and the solvent and residual monomers were then removed at 115° C. in vacuo. Monomer conversion: 96%; filter evaluation: 1; viscosity (25° C., shear rate 48/s): 5,500 mPas.

Example 10

Preparation of a Polymer Polyol (Polystyrene/hexanediol Diacrylate Copolymer as the Dispersed Phase, at a Calculated Weight Content of 37 Parts by Weight)

1,003.5 g polyol B, 6.9 g of the stabilizer from Example 1, 250 g ethanol, 322 g styrene, 1 g hexanediol diacrylate and 1.7 g Initiator 1 (VAZO 67®) were initially introduced into the reaction vessel, with nitrogen being passed through the initial mixture at room temperature for ½ h before the addition of styrene. The initial mixture was heated to 88° C. to 90° C. and kept at this temperature for 40 min., and 417.4 g styrene and 15.6 g of the stabilizer from Example 1 were added. Then, 150 g polyol B, 16.6 g of the stabilizer from Example 2, 50 g ethanol and 5.4 g Initiator 1 (VAZO 67®) were added at the reaction temperature over a period of 70 min. Thereafter, 50 g polyol B, 5.5 g of the stabilizer from Example 1 and 50 g ethanol were metered in over a period of 40 min, and the mixture was allowed to after-react at 88° C. to 90° C. for 60 min. Solvent and residual monomers were removed at 115° C. in vacuo. Monomer conversion: 96.5%; filter evaluation: 1; viscosity (25° C., shear rate: 48/s): 5,640 mPas.

Example 11

Preparation of a Polymer Polyol (Pure Polystyrene as the Dispersed Phase, at a Calculated Weight Content of 37 Parts by Weight)

1013.5 g polyol B, 22.2 g of the stabilizer from Example 3, 250 g ethanol and 740 g styrene were initially introduced into the reaction vessel, with nitrogen being passed through the initial mixture at room temperature for ½ h before the addition of styrene. The initial mixture was heated to 88° C. to 90° C. and 150 g polyol B, 13.3 g of the stabilizer from Example 3, 50 g ethanol and 6.6 g Initiator 1 (VAZO 67®) were then metered in over a period of 90 min. Thereafter, 50 g polyol B, 4.4 g of the stabilizer from Example 3 and 50 g ethanol were metered in over a period of 40 min, and the mixture was allowed to after-react at 88° C. to 90° C. for 60 min. Solvent and residual monomers were removed at 115° C. in vacuo. Styrene conversion: 98.0%; filter evaluation: 1; viscosity (25° C., shear rate 48/s): 6,000 mPas.

Example 12

Production of a Flexible Polyurethane Foam Moulding 96.5 g of a glycerol-initiated polyether (with a content of 17.7% of ethylene oxide and 82.3% of propylene oxide, OH number: 28), 6.72 g of water, 0.21 g of bis-2-(dimethylamino)-ethyl ether, 0.53 g of triethylenediamine, 2.10 g of an 80% solution of diisopropanolamine in water, 2.10 g of foam stabilizer B 8701 (a copolymer of polydimethylsiloxane and a polyether) and 2.52 g of diethanolamine are added to 113.5 g of the polymer polyol of Example 11. This mixture is stirred at approx. 4,200 r.p.m. for 30 secs. 87.30 g of Desmodur T 80 are then added to this mixture, which is stirred again at 4,200 r.p.m. for 7 secs, after which the reaction mixture is poured into a mould preheated to 50° C. (and having a volume of approx. 3,900 cm$^3$), which is closed with the aid of a press. The mould is left at room temperature for precisely 8 mins, after which the foam moulding is released from the mould and closed cells are mechanically opened.

After storage for 24 hours at room temperature the following physical data (with a density of 46.4 kg/m$^3$) are measured using test specimens:

| | |
|---|---|
| compressive strength (40% compression): | 9.0 kPa |
| tensile strength: | 200 kPa |
| elongation at break | 90% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of the finely dispersed, low-viscosity polymer polyols, comprising (I) polymerizing (B) a polymer comprising (1) styrene, or (2) a mixture of styrene and at least one other ethylenically unsaturated monomer which can be copolymerized with styrene, in the presence of (A) a base polyol, and (C) a polymer containing mercaptan groups and/or disulfide groups which is compatible with said base polyol (A) and has a number average molecular weight of about 500 to 100,000 and contains an average of at least 0.5 mercaptan groups or 1 disulfide group per molecule, and (D) an active amount of a free-radical initiator, and (E) a polar solvent, wherein component (C) is present in an amount of 1 to 6% by weight, and component (B) is present in an amount of 30 to 60% by weight, with the %'s by weight being based on the combined weight of components (A), (B) and (C).

2. In a process for the production of polyurethanes, comprising reacting an organic polyisocyanate component with an isocyanate-reactive component, the improvement wherein said isocyanate-reactive component comprises the polymer polyol of claim 1.

3. The process of claim 2, wherein said polyurethane is a polyurethane foam.

4. The process of claim 1, wherein the polar solvent (E) is selected from the group consisting of methanol, ethanol, 1-propanol, 2-propanol, 1-butanol, 2-butanol, 1-pentanol and ethylene glycol.

5. The process of claim 1, wherein the polar solvent (E) comprises ethanol.

* * * * *

UNITED STATES PATENT AND TRADEMARK OFFICE
CERTIFICATE OF CORRECTION

PATENT NO.     : 6,472,447 B1
DATED          : October 29, 2002
INVENTOR(S)    : Klaus Lorenz et al.

It is certified that error appears in the above-identified patent and that said Letters Patent is hereby corrected as shown below:

Title page,
Item [75], Inventors, insert -- [73] Assignee: Bayer Aktiengesellschaft, Leverkusen (DE) --.

Signed and Sealed this

Eighteenth Day of March, 2003

JAMES E. ROGAN
*Director of the United States Patent and Trademark Office*